United States Patent
Hong et al.

(10) Patent No.: US 6,628,606 B1
(45) Date of Patent: Sep. 30, 2003

(54) COARSE FREQUENCY OFFSET ESTIMATOR IN ORTHOGONAL FREQUENCY DIVISION MULTIPLEXING RECEIVER AND METHOD THEREOF

(75) Inventors: Dae-sik Hong, Seoul (KR); Keuk-joon Bang, Seoul (KR); Kyoung-shin Park, Suwon (KR); Hyun-cheol Park, Ansan (KR)

(73) Assignees: Samsung Electronics Co., Ltd., Kyungki-Do (KR); Yonsei University, Seoul (KR)

( * ) Notice: Subject to any disclaimer, the term of this patent is extended or adjusted under 35 U.S.C. 154(b) by 0 days.

(21) Appl. No.: 09/472,883

(22) Filed: Dec. 28, 1999

(30) Foreign Application Priority Data

Dec. 28, 1998 (KR) .......................................... 1998-59396

(51) Int. Cl.[7] .............................. H04B 1/69; H04J 11/00; H04J 15/00
(52) U.S. Cl. ........................ 370/208; 370/210; 375/260; 375/343
(58) Field of Search ................................ 370/203, 208, 370/210, 215; 375/142, 150, 343, 260, 261

(56) References Cited

U.S. PATENT DOCUMENTS

| | | | |
|---|---|---|---|
| 5,450,456 A | | 9/1995 | Mueller |
| 5,995,483 A | * | 11/1999 | Marchok et al. ............. 370/207 |
| 6,122,246 A | * | 9/2000 | Marchok et al. ............. 370/208 |
| 6,359,938 B1 | * | 3/2002 | Keevill et al. ............... 375/316 |
| 6,449,246 B1 | * | 9/2002 | Barton et al. ................ 370/210 |

FOREIGN PATENT DOCUMENTS

| | | |
|---|---|---|
| JP | 8-265292 | 10/1996 |
| JP | 11-308194 | 11/1999 |

* cited by examiner

*Primary Examiner*—Alpus H. Hsu
*Assistant Examiner*—Toan D. Nguyen
(74) *Attorney, Agent, or Firm*—Sughrue Mion, PLLC

(57) ABSTRACT

Coarse frequency offset estimation method and device in an orthogonal frequency division multiplexing (OFDM) receiver are provided. The coarse frequency offset estimation device includes a buffer for receiving demodulated symbol $X(k)$ and cyclic shifting the symbol $X(k)$ by a predetermined shift amount d and outputting shifted symbol $X(k+d)$, a reference symbol generator for generating a reference symbol $Z(k)$, a counter for counting the shift amount of d, a partial correlation for receiving the shifted symbol $X(k+d)$ and the phase reference symbol $Z(k)$ and calculating a partial correlation value $$\sum_{m=0}^{K-1} \left| \sum_{k=m(N/K)}^{(m+1)(N/K)-1} X(((k+d)_N)Z^*(k)) \right|$$

with respect to K divided bands, wherein a range of shift amount d is between $-N/2$ and $N/2$, and a maximum detector for obtaining a shift amount of d by which the partial correlation value is maximum, and outputting the shift amount of d as an estimated coarse frequency offset value. Thus, stable coarse frequency offset estimation can be performed by a small number of calculations.

6 Claims, 8 Drawing Sheets

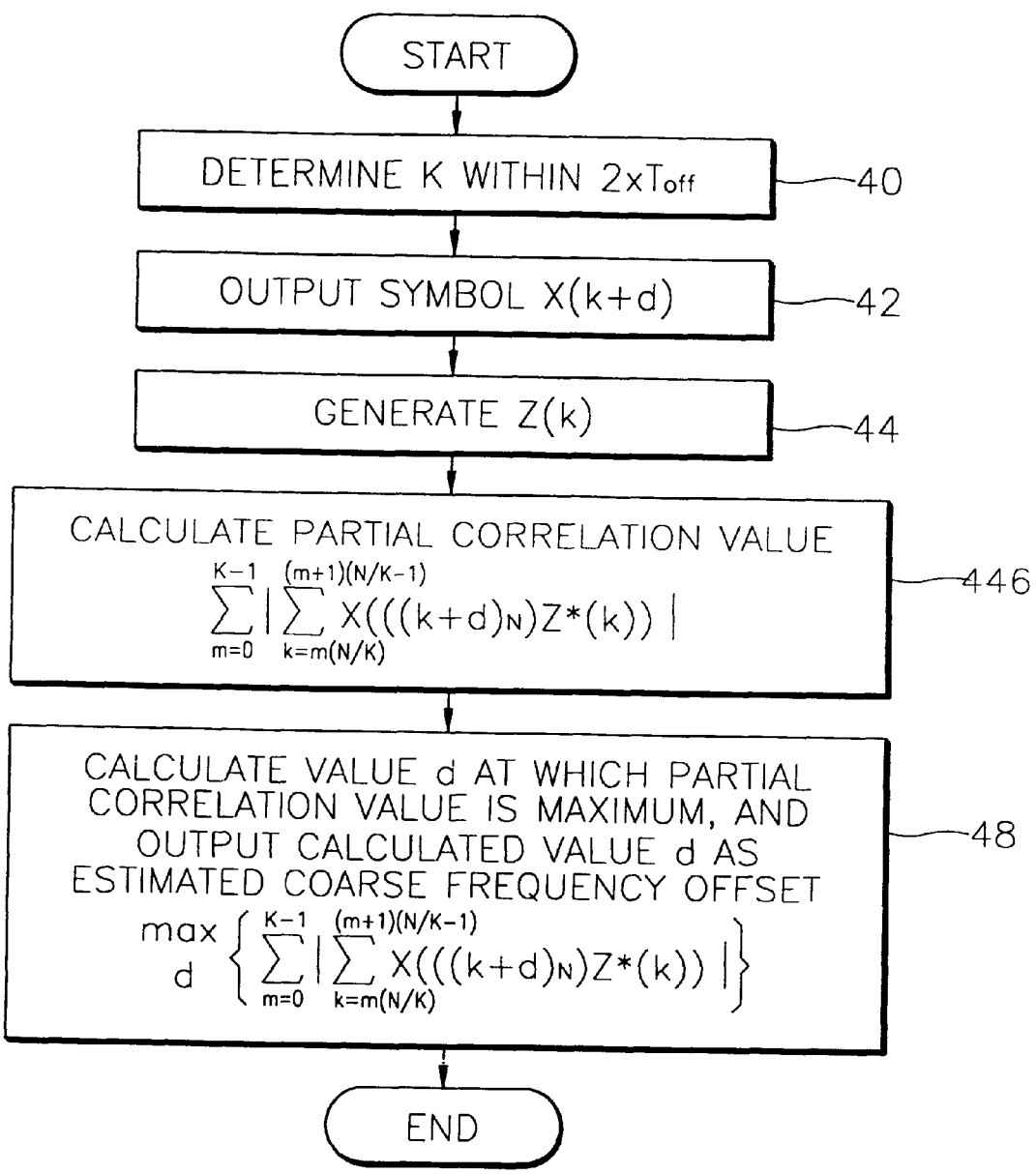

COARSE FREQUENCY OFFSET ESTIMATOR IN ORTHOGONAL FREQUENCY DIVISION MULTIPLEXING RECEIVER AND METHOD THEREOF

BACKGROUND OF THE INVENTION

1. Field of the Invention

The present invention relates to an orthogonal frequency division multiplexing (OFDM) receiver, and more particularly, to a coarse frequency offset estimator in an OFDM receiver, and a method of estimating a coarse frequency offset.

2. Description of the Related Art

FIG. 1 is a block diagram showing the structure of a conventional OFDM receiver. Referring to FIG. 1, the conventional OFDM receiver includes an OFDM demodulator 10 and a coarse frequency offset estimator 12. The OFDM demodulator 10 includes a radio frequency (RF) receiver 101, an analog-to-digital converter (ADC) 102, an in-phase/quadrature (I/Q) separator 103, a frequency corrector 104, a fast Fourier transformer (FFT) 105, and a Viterbi decoder 106. The coarse frequency offset estimator 12 includes a register 121, a complex data multiplier 122, an inverse fast Fourier transformer (IFFT) 123, a maximum value detector 124, a counter 125, and a reference symbol generator 126.

In the operation of the receiver having such a configuration, first, the RF receiver 101. receives an RF wave and outputs an RF signal. The ADC 102 quantizes the RF signal. The I/Q separator 103 separates an in-phase (I) component and a quadrature (Q) component from the quantized RF signal. The frequency corrector 104 performs frequency-correcting. The FFT 105 receives a frequency-corrected signal and performs Fourier-transforming of the frequency-corrected signal, thereby performing demodulation. The Viterbi decoder 106 decodes a demodulated signal.

Meanwhile, the demodulated signal is stored in the register 121 of the coarse frequency offset estimator 12, and is output as a received signal X. A reference symbol which is output by the reference symbol generator 126 is represented by Z. When a received symbol has a frame synchronization offset of $\omega$, and frequency offset does not exist, if the k-th sub-carriers of the received symbol X and the reference symbol Z are $X_k$ and $Z_k$, respectively, $X_k$ and $Z_k$ have a relationship as $X_k = Z_k e^{-j2\pi k\omega/N}$. The complex data multiplier 122 multiplies the conjugate value of $X_k$ by the conjugate value of $Z_k$. The signal output from the complex data multiplier 122 is inversely Fourier-transformed by the IFFT 123, and the following signal $h_n$ is output:

$$h_n = IFFT\{XZ^*\} \quad (1)$$

$$= 1/N \sum_{k=0}^{N-1} X_k Z_k^* e^{j2\pi kn/N}$$

$$= 1/N \sum_{k=0}^{N-1} Z_k e^{-j2\pi k\omega/N} Z_k^* e^{j2\pi kn/N}$$

$$= 1/N \sum_{k=0}^{N-1} |Z_k|^2 e^{j2\pi k(n-\omega)/N}$$

$$= \delta(n - \omega)$$

A received symbol $X_k$ having an integer multiple $\Delta f_i$ of a frequency offset with respect to a transmitted symbol $Z_k$ can be expressed as $Z_{k-\Delta f_i} e^{-j2\pi k\omega/N}$, so that Equation 1 can be expressed as the following Equation 2:

$$h_n = IFFT\{XZ^*\} \quad (2)$$

$$= 1/N \sum_{k=0}^{N-1} X_k Z_k^* e^{j2\pi kn/N}$$

$$= 1/N \sum_{k=0}^{N-1} Z_{k-\Delta f_i}^* e^{-j2\pi k\omega/N} Z_k^* e^{j2\pi kn/N}$$

The result of Equation 2 is the same as a process for obtaining the convolution of two signals in the time domain, and the result value $h_n$ is a channel impulse response (CIR). As described above, an OFDM system which has reference symbol in a frequency domain can obtain the CIR using a received symbol. Here, because the reference symbol Z consists of a pseudo noise (PN) sequence, maximum peak value exists only if frequency offset $\Delta f_i$ is zero, and if otherwise noisy peaks with small value are gained. Using such a relationship, the coarse frequency offset estimator 12 shifts a received symbol with respect to $\Delta f_i$, and the maximum value detector 124 detects a maximum peak value according to Equation 2. The counter 125 obtains a shift amount $\Delta f_i$ in which the maximum peak value is generated. The shift amount $\Delta f_i$ becomes an offset value $F_o$ which is an integral multiple of a frequency offset intended to be detected, which establishes a relationship expressed as the following Equation 3:

$$F_o = \max_{\Delta f_i} \{\max amp[IFFT\{X_R Z\}]\} \quad (3)$$

wherein Z denotes a reference symbol, and $X_R$ is expressed as a symbol $X_{((k+\Delta f_i))N}$, obtained by shifting an individual sub-carrier $X_k$ of a received symbol X by $\Delta f_i$ in the frequency domain.

According to this coarse frequency offset estimation method, a conventional OFDM receiver as described above can theoretically and practically estimate an almost exact frequency offset in all cases regardless of a channel environment or a frame synchronization error. However, this method has significantly many calculation processes. Thus, a very complicated inverse fast Fourier transformation (IFFT) module is required to estimate an accurate frequency offset within a predetermined short period of time. Also, a long response time causes an excessive time delay.

To solve the problem, another conventional coarse frequency offset estimation method is disclosed. According to the method, first, to find out the influence of a frequency offset on the received symbol, $f_k$ and $f_{off}$ are defined. Here, $f_k$ denotes the frequency of a k-th sub-carrier, and $f_{off}$ denotes an actual frequency offset. The frequency offset is expressed as a multiple of a subcarrier frequency interspacing. Generally, the frequency offset includes an offset expressed as an integral multiple of the subcarrier frequency interspacing, and an offset expressed as a prime multiple thereof, and the multiples are individually processed. Thus, each term in: $f_k + f_{off}$ can be defined as the following Equation 4:

$$f_k = \frac{k}{T_s} \quad (4)$$

$$f_{off} = \Delta f \frac{1}{T_s} = (\Delta f_i + \Delta f_f) \frac{1}{T_s}$$

wherein $\Delta f$ denotes the frequency offset of a subcarrier expressed by a multiple of a subcarrier frequency interspacing. Also, $\Delta f$ is expressed as the sum of an integer number $\Delta f_i$ and a floating number $\Delta f_f$ which satisfies a condition $-\frac{1}{2} < \Delta f_f < \frac{1}{2}$. Under this condition, a received symbol of an n-th symbol is expressed as the following Equation. However, for convenience of the development of the following Equation 5, it is assumed that no noise exists.

$$r_n(m) = \sum_{k=0}^{N-1} C_{n,k} e^{j2\pi\left[\frac{k}{T_s} + (\Delta f_i + \Delta f_f)\frac{1}{T_s}\right]\frac{T_s}{N}m} \qquad (5)$$

$$= \sum_{k=0}^{N-1} C_{n,k} e^{j2\pi[(k+\Delta f_i + \Delta f_f)]m/N}$$

wherein $C_{n,k}$ denotes a k-th sub-carrier of an n-th symbol in a frequency domain, and N denotes the number of OFDM sub-carriers.

Meanwhile, when an integral multiple of a frequency offset $\Delta fi$ among frequency offsets is zero, a demodulated signal $\hat{C}'_{n,p}$ is expressed as the following Equation 6:

$$\hat{C}'_{n,p} = \frac{1}{N} \sum_{m=0}^{N-1} r_n(m) e^{-j2\pi mp/N} \qquad (6)$$

$$= \frac{1}{N} \sum_{m=0}^{N-1} \sum_{k=0}^{N-1} C_{n,k} e^{j2\pi(k+\Delta f_f)\frac{m}{N}} e^{-j2\pi mp/N}$$

$$= \frac{1}{N} \sum_{k=0}^{N-1} C_{n,k} \sum_{m=0}^{N-1} e^{j2\pi(k+\Delta f_f - p)\frac{m}{N}}$$

$$= \frac{1}{N} \sum_{k=0}^{N-1} C_{n,k} \left\{ e^{j\pi(p-k-\Delta f_f)} \frac{\sin(\pi(p-k-\Delta f_f))}{N\sin(\pi/N(p-k-\Delta f_f))} \right\}$$

As shown in the last line of Equation 6, the demodulated signal $\hat{C}'_{n,p}$ is calculated depending on an integer of k. Thus, if a frequency offset $\Delta f_f$ of a prime multiple is zero, the demodulated signal $\hat{C}'_{n,p}$ having peaks is output only at a frequency where k is equal to p, and a demodulated signal $\hat{C}'_{n,p}$ having a zero peak is output at other frequencies. That is, the orthogonality between frequencies is kept. However, if the frequency offset $\Delta f_f$ is not zero, the peak of the demodulated signal $\hat{C}'_{n,p}$ is reduced even at a frequency where k is equal to p, and the demodulated signal $\hat{C}'_{n,p}$ having peaks other than a zero peak is output at other frequencies. Such a phenomenon causes interference between sub-carriers, thus becoming a factor of interchannel interference (ICI). The demodulated signal $\hat{C}'_{n,p}$ is obtained from the received signal of Equation 5 as the following Equation 7:

$$\hat{C}_{n,p} = \frac{1}{N} \sum_{m=0}^{N-1} r_n(m) e^{-j2\pi mp/N} \qquad (7)$$

$$= \frac{1}{N} \sum_{m=0}^{N-1} \sum_{k=0}^{N-1} C_{n,k} e^{j2\pi km/N} e^{-j2\pi m(p-\Delta f_i)/N}$$

$$= \hat{C}'_{n,p-\Delta f_i}$$

This result shows that when a frequency offset, an integral multiple of a sub-carrier frequency, is $\Delta f_i$, a signal to be demodulated is shifted by $\Delta f_i$ and demodulated. Here, Equation 7 includes a discrete Fourier transformation (DFT) process, and shifted demodulation is performed through cyclic shifting.

Therefore, according to the another example of conventional coarse frequency offset estimation method, a correlation value is obtained while cyclic shifting an already-known phase reference symbol and a received signal for a symbol period, and the amount of shift for which the correlation value is maximum is determined to be an integral multiple of a frequency offset. This relationship is expressed as the following Equation 8:

$$\max_{d} \left\{ \sum_{k=0}^{N-1} X(((k+d))_N) Z^*(k) \right\} \qquad (8)$$

wherein $((k+d)N)$ is a symbol indicating a modulo-N addition operation, $X(k)$ denotes a k-th received signal after DFT, and $Z(k)$ denotes a k-th phase reference signal. Also, both $X(k)$ and $Z(k)$ are signals in the frequency domain.

However, this method cannot correct a frequency offset when frame synchronization has not been achieved.

SUMMARY OF THE INVENTION

An objective of the present invention is to provide a coarse frequency offset estimator in an orthogonal frequency division multiplexing (OFDM) receiver, by which frequency synchronization is stably performed through a small number of calculations.

Another objective of the present invention is to provide a coarse frequency offset estimating method performed by the device.

Still another objective of the present invention is to provide an OFDM receiver which can perform stable frequency synchronization through a small number of calculations.

Accordingly, to achieve the above first objective, the present invention provides a device for estimating a coarse frequency offset in an orthogonal frequency division multiplexing (OFDM) receiver, the device including: a buffer for receiving demodulated symbol X(k) and cyclic shifting the symbol X(k) by a predetermined shift amount d and outputting shifted symbol X(k+d); a reference symbol generator for generating a reference symbol Z(k); a counter for counting the shift amount of d; a partial correlation for receiving the shifted symbol X(k+d) and the phase reference symbol Z(k) and calculating a partial correlation value $$\sum_{m=0}^{K-1} \left| \sum_{k=m(N/K)}^{(m+1)(N/K)-1} X(((k+d))_N) Z^*(k) \right|$$

with respect to K divided bands, wherein a range of shift amount d is between $-N/2$ and $N/2$; and a maximum detector for obtaining a shift amount of d by which the partial correlation value is maximum, and outputting the shift amount of d as an estimated coarse frequency offset value.

It is preferable that the number of divided bands, K, is set to be within 2 $T_{off}$ when a timing synchronization offset which can be covered by frame synchronization is set to be $T_{off}$.

To achieve the second objective, the present invention provides a method of estimating a coarse frequency offset in an orthogonal frequency division multiplexing (OFDM) receiver, the method including the steps of: (a) generating a reference symbol Z(k); (b) counting the shift amount of d; (c) receiving the shifted symbol X(k+d) and the phase reference symbol Z(k); (d) calculating a partial correlation value $$\sum_{m=0}^{K-1} \left| \sum_{k=m(N/K)}^{(m+1)(N/K)-1} X(((k+d)_N) Z^*(k)) \right|$$

with respect to K divided bands, wherein a range of shift amount d is between −N/2 and N/2; and (e) obtaining a shift amount of d by which the partial correlation value is maximum, and outputting the shift amount of d as an estimated coarse frequency offset value.

To achieve the third objective, the present invention provides an orthogonal frequency division multiplexing (OFDM) receiver including: a buffer for receiving demodulated symbol X(k) and cyclic shifting the symbol X(k) by a predetermined shift amount d and outputting shifted symbol X(k+d); a reference symbol generator for generating a reference symbol Z(k); a counter for counting the shift amount of d; a partial correlation for receiving the shifted symbol X(k+d) and the phase reference symbol Z(k) and calculating a partial correlation value $$\sum_{m=0}^{K-1} \left| \sum_{k=m(N/K)}^{(m+1)(N/K)-1} X(((k+d)_N) Z^*(k)) \right|$$

with respect to K divided bands, wherein a range of shift amount d is between −N/2 and N/2; and a maximum detector for obtaining a shift amount of d by which the partial correlation value is maximum, and outputting the shift amount of d as an estimated coarse frequency offset value.

BRIEF DESCRIPTION OF THE DRAWINGS

The above objectives and advantage of the present invention will become more apparent by describing in detail a preferred embodiment thereof with reference to the attached drawings in which:

FIG. 4 is a flowchart illustrating essential steps of a coarse frequency offset estimation method according to an embodiment of the present invention;

DESCRIPTION OF THE PREFERRED EMBODIMENT

Figure 1:
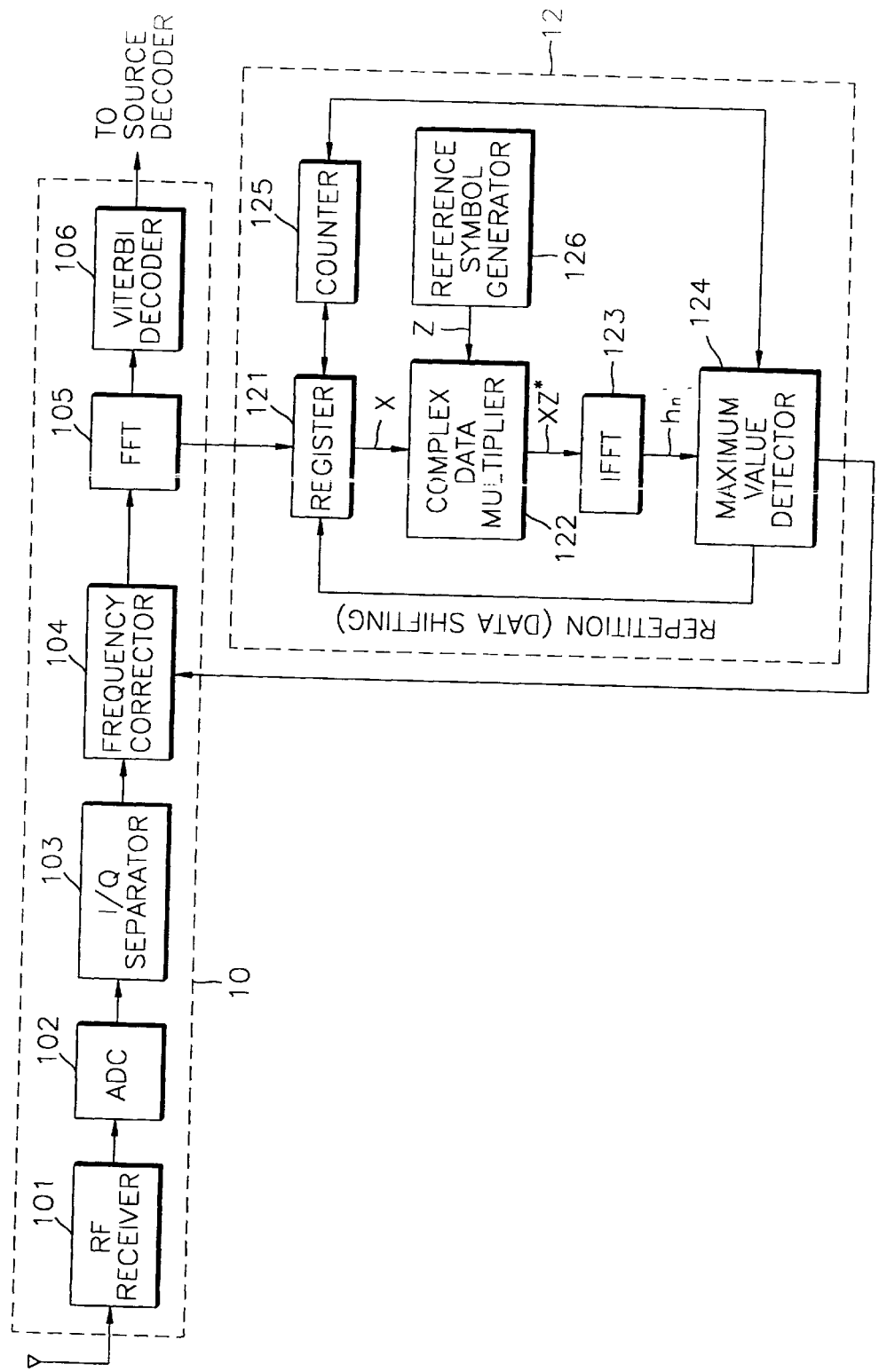
FIG. 1 is a block diagram illustrating an example of the structure of a conventional orthogonal frequency division multiplexing (OFDM) receiver.

According to the present invention, a correlation value and a delayed coherence bandwidth is used. The correlation value and the delayed coherence bandwidth will now be described in detail to facilitate understanding about a coarse frequency offset estimation device.and method according to the present invention.

The problem of not being able to correct a frequency offset when frame synchronization has not been achieved is solved by analyzing the delayed coherence bandwidth between a received symbol and a phase reference symbol.

The delayed coherence bandwidth between a received symbol and a phase reference symbol will now be described by taking a digital audio broadcasting (DAB) system using OFDM as an example. Generally, the coherence bandwidth of a channel means a statistically-measured frequency band which can be considered to be a channel which passes signals so that approximately the same gain and phase are obtained with respect to all spectrum elements. In other words, a frequency bandwidth where two different arbitrary frequency components have a strong correlation therebetween, within a certain frequency band, is called the coherence bandwidth of a channel. If the coherence bandwidth of a channel is $B_c$, two sinusoidal wave signals having a large frequency difference that is greater than $B_c$ are differently affected in a channel, which means that the correlation between the two signals cannot be ensured.

When two identical signals having a delay relationship therebetween in the time domain are discretely Fourier-transformed, and the coherence value of the two transformed signals is obtained in the frequency domain, a frequency section where the coherence of the two signals is maintained exists. Such a frequency section is defined as a delayed coherence bandwidth. If this relationship is described with reference to the above-described channel coherence bandwidth, two signals within a frequency band corresponding to the delayed coherence bandwidth always have a strong correlation to each other.

In the OFDM system, a time domain signal is set to be z(t), and a delayed signal having a frame synchronization offset of $T_{off}$ of z(t) is set to be $z(t+T_{off})$. Also, if a Discrete Fourier-Transformed frequency domain signal is Z(k), a frequency domain signal obtained by Discrete Fourier-Transforming a signal $z(t+T_{off})$ can be expressed as the following Equation 9:

$$DFT\{z(t+T_{off})\} = \sum_{k=0}^{N-1} e^{j2\pi k T_{off}/N} Z(k) \quad (9)$$

wherein it is assumed that there is no noise and no frequency offset for convenience of the development of an equation, and N denotes the number of sub-carriers.

Meanwhile, the delayed coherence bandwidth is defined as a frequency band where two signals always have a strong correlation between them, within an arbitrary frequency band. That is, the delayed coherence bandwidth denotes a maximum frequency band B in which the correlation between two signals Z(k) and $e^{j2\pi k T_{off}/N} Z(k)$ is always a threshold or greater. This relationship is expressed as the following; Equation 10:

$$\left| \sum_{k=m}^{m+B-1} Z^*(k) e^{j2\pi k T_{off}/N} Z(k) \right| \geq T_c, \text{ for all } m, 0 \leq m \leq N-B \quad (10)$$

wherein $T_c$ denotes a threshold, and N denotes the number of sub-carriers. If an OFDM signal satisfies |z(k)|=1, the right side of Equation 10 can be expressed as the following Equation 11:

$$\left|\sum_{k=m}^{m+B-1} Z^*(k)e^{j2\pi k T_{off}/N} Z(k)\right| = \left|\sum_{k=m}^{m+B-1} e^{j2\pi k T_{off}/N}\right| = \sqrt{\left|\sum_{k=m}^{m+B-1} \cos(2\pi k T_{off}/N)\right|^2 + \left|\sum_{k=m}^{m+B-1} \sin(2\pi k T_{off}/N)\right|^2} \quad 0 \le m \le N - B \tag{11}$$

wherein the conditions correspond to the case of a OFDM system. To be independent of the start position m, in the integration section, Equation 11 can be rearranged into following Equation 12:

$$\sqrt{\left|\sum_{k=m}^{m+B-1} \cos(2\pi k T_{off}/N)\right|^2 + \left|\sum_{k=m}^{m+B-1} \sin(2\pi k T_{off}/N)\right|^2} = \sqrt{\left|\sum_{k=0}^{B-1} \cos(2\pi k T_{off}/N)\right|^2 + \left|\sum_{k=0}^{B-1} \sin(2\pi k T_{off}/N)\right|^2} \tag{12}$$

Also, when Equation 12 is applied to Equation 10, the delayed coherence bandwidth can be expressed in terms of a change in frame timing offset as the following Equation 13:

$$\sqrt{\left|\sum_{k=0}^{B-1} \cos(2\pi k T_{off}/N)\right|^2 + \left|\sum_{k=0}^{B-1} \sin(2\pi k T_{off}/N)\right|^2} > T_c \tag{13}$$

The left side of Equation 13 obtains a correlation value between an original symbol z(t) and a delayed symbol z(t+$T_{off}$) having a time offset of $T_{off}$ with respect to maximum band B. That is, the delayed coherence bandwidth denotes a maximum band B in which the correlation value between the original symbol and a delayed symbol Z is always greater than the threshold $T_c$.

Figure 2:
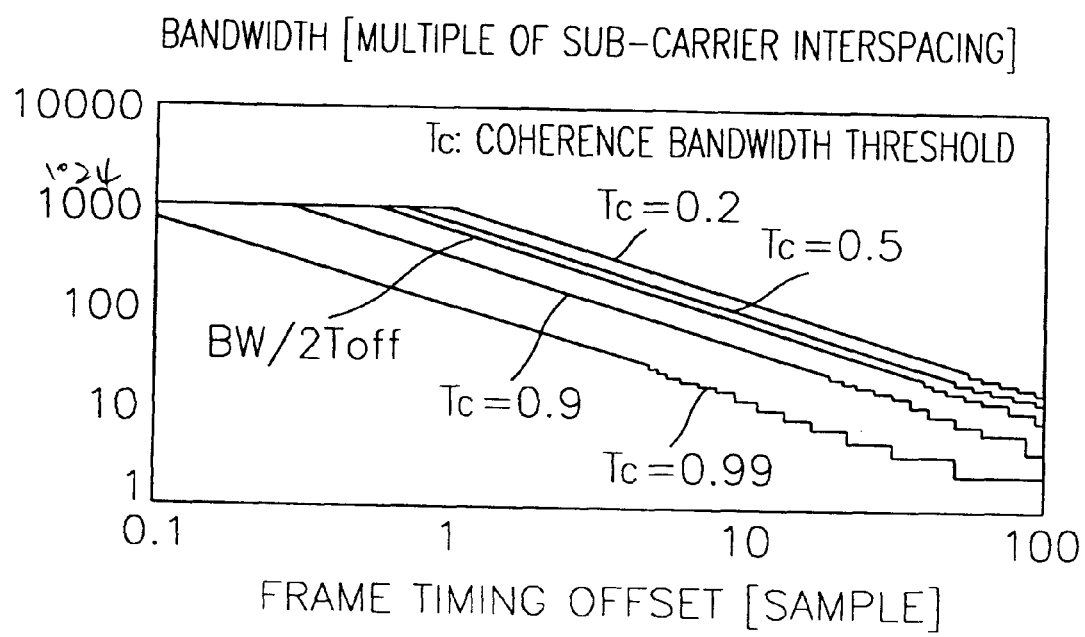
FIG. 2 is a graph illustrating a relationship between a frame timing offset and a delayed coherence bandwidth with respect to a delayed symbol having a frame timing offset and an original symbol, in order to explain a device and method of estimating a coarse frequency offset, according to the present invention.

FIG. 2 is a graph showing a relationship between a frame timing offset and a delayed coherence bandwidth with respect to a delayed symbol having a frame timing offset and an original symbol, which are obtained through computer simulation. Referring to FIG. 2, a bandwidth is expressed as a multiple of the spacing between sub-carriers, and the total band of a channel is set to be 1024. Also, when a coherence bandwidth threshold ($T_c$) is set to be 0.2, 0.5, 0.9 and 0.99, the delayed coherence bandwidth is obtained from when no time synchronization offset exists, to when a time synchronization offset exists, that is, a sample of 100.0. It can be seen from FIG. 2 that the delayed coherence bandwidth decreases with an increase in coherence bandwidth threshold ($T_c$).

Also, FIG. 2 shows the relationship between the time synchronization offset ($T_{off}$), a time delay factor, and the coherence bandwidth, to describe the fact that the time delay factor is the reciprocal of the coherence bandwidth. In this graph, the relationship is defined by BW/2$T_{off}$. Referring to the relationship defined by BW/2$T_{off}$, a change in bandwidth with respect to the time synchronization offset is similar to the change in bandwidth when the coherence bandwidth threshold ($T_c$) is set to be 0.5. Therefore, in the present invention, a delayed coherence bandwidth approximated to $$\frac{1}{2T_{off}} \times BW$$

is used.

Coarse frequency synchronization in an OFDM receiver according to the present invention will now be described in detail. First, when Z(k) in Equation 8 is a reference symbol signal, the signal x(t) obtained by performing an inverse Fourier transform on the received symbol X(k) is called with a received signal, and the received signal x(t) has a time delay of Δt, that is, a frame timing offset, the frame timing offset Δt becomes the reciprocal of a delayed coherence bandwidth on a frequency axis according to the above-described relationship. This indicates a decrease in delayed coherence bandwidth in the frequency domain with an increase in frame timing offset.

The coarse frequency offset estimation according to the present invention is essentially coarse frequency synchronization which uses a correlation value using a reference signal. According to the present invention, when a cross-correlation value is obtained, an integration section is set to be smaller than the delayed coherence bandwidth which is obtained by a reference signal and a signal having a time synchronization offset. That is, in order to obtain the cross correlation value between the reference signal and the received signal, the size of an integration section is reduced to be within the delayed coherence bandwidth between two signals, partial correlation values for several small integration section blocks are obtained, and the mean or sum of the obtained partial correlation values is taken.

This method excludes a non-coherence band which is formed due to an inaccurate frame synchronization between the phase reference signal and the received signal, so that the cross correlation value is always significant. Thus, relatively accurate coarse frequency synchronization is performed within a time synchronization offset range which can be ensured by frame synchronization. These principles are applied to the coarse frequency offset estimation device and method according to the present invention.

Figure 3:
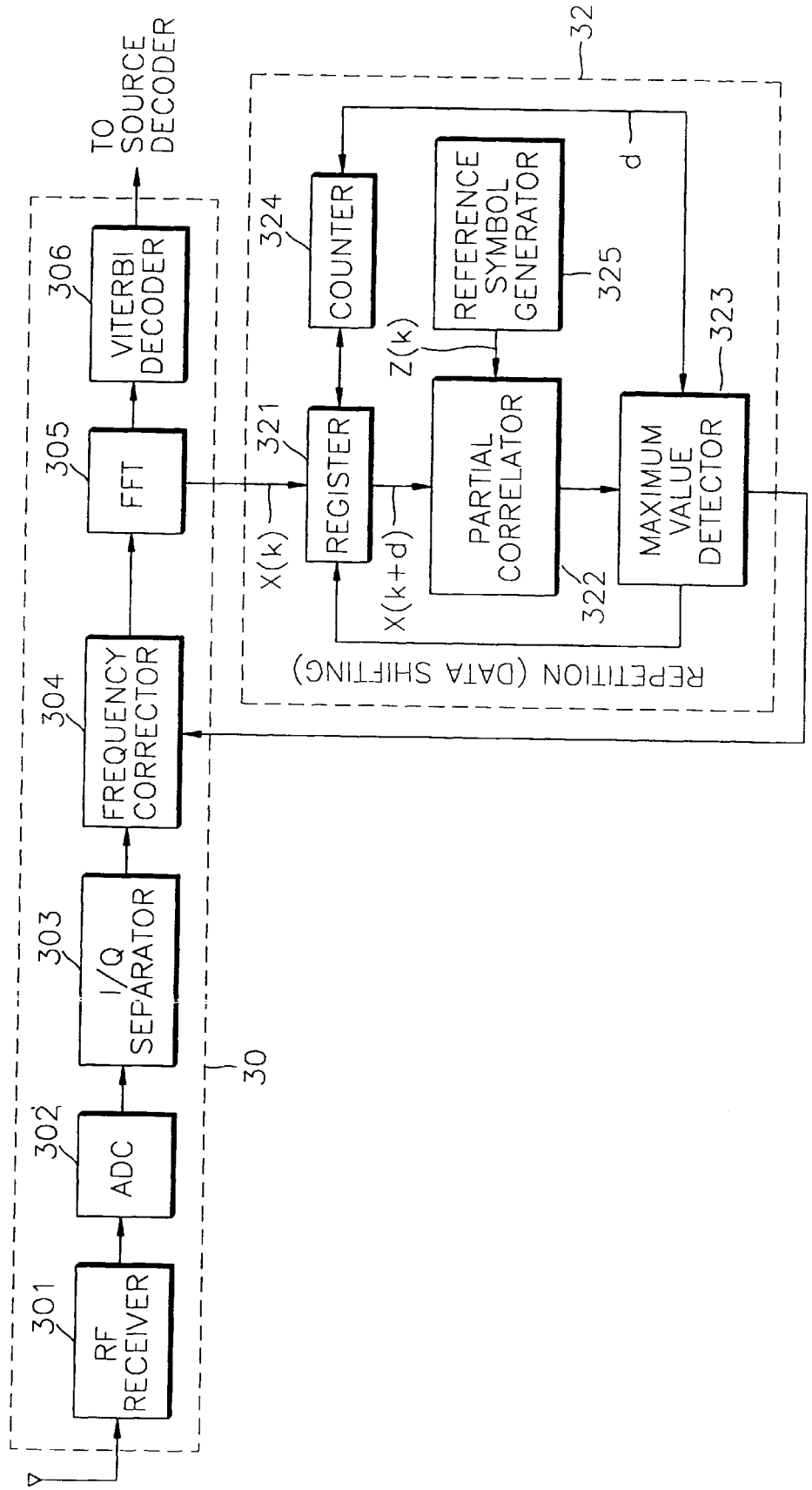
FIG. 3 is a block diagram illustrating the structure of an OFDM receiver including a coarse frequency offset estimation device according to an embodiment of the present invention.

FIG. 3 is a block diagram illustrating an example of the structure of an OFDM receiver including a coarse frequency offset estimator according to an embodiment of the present invention. Referring to FIG. 3, the OFDM receiver includes an OFDM demodulator 30 and a coarse frequency offset estimator 32. The OFDM demodulator 30 includes an RF receiver 301, an ADC 302, an I/Q separator 303, a frequency corrector 304, an FFT 305, and a Viterbi decoder 306. The coarse frequency offset estimator 32 includes a register 321, a partial correlator 322, a maximum value detector 323, a counter 324, and a reference symbol generator 325.

In the OFDM receiver according to the present invention, the coarse frequency offset estimator performs coarse frequency synchronization. FIG. 4 is a flowchart illustrating essential steps of a coarse frequency offset estimation method in an OFDM receiver according to an embodiment of the present invention. Referring to FIG. 4, in the coarse frequency offset estimation method according to the present invention, an integration section K is determined within a range of 2 $T_{off}$, in step 40. Next, demodulated symbol is received, and a symbol X(k+d) cyclically shifted by a predetermined shift amount d is stored and output, in step 42. Then, a phase reference symbol Z(k) is generated in step 44. Following this, a received signal X(k+d) and a phase reference signal Z(k) are received while computing the shift amount d, and $$\sum_{m=0}^{K-1} \left| \sum_{k=m(N/K)}^{(m+1)(N/K)-1} X(((k+d)_N)Z^*(k)) \right|$$

is calculated as the partial correlation value for K divided bands, in step 46. Then, a shift amount d at which the partial correlation value is maximum is output as an estimated coarse frequency offset value, in step 48.

Referring back to FIG. 3, in the operation of the coarse frequency offset estimator according to an embodiment of the present invention, the register 321 receives demodulated symbol X(k) and stores and outputs symbol X(k+d) which has been cyclically shifted by a predetermined shift amount d. The counter 324 computes the shift amount d. The reference symbol generator 325 generates a phase reference symbol Z(k). The partial correlator 322 receives a received symbol X(k+d) and a reference symbol Z(k), and calculates $$\sum_{m=0}^{K-1} \left| \sum_{k=m(N/K)}^{(m+1)(N/K)-1} X(((k+d)_N)Z^*(k)) \right|$$

as the partial correlation value for K divided bands. The maximum detector 323 obtains and outputs a shift amount d at which the partial correlation value is maximum. Consequently, the coarse frequency offset estimator according to the present invention uses the following Equation 14:

$$\sum_{m=0}^{K-1} \left| \sum_{k=m(N/K)}^{(m+1)(N/K)-1} X(((k+d)_N)Z^*(k)) \right| \quad (14)$$

wherein N denotes the number of sub-carriers, and K denotes the number of sections into which a correlation function integration section is divided. That is, one integration section corresponds to N/K sub-carrier bands. Also, if a divided individual band is $BW_s$, the size of a divided band BWs among K divided bands is 1/K BW (where BW denotes the entire band of a channel).

Figure 5A:
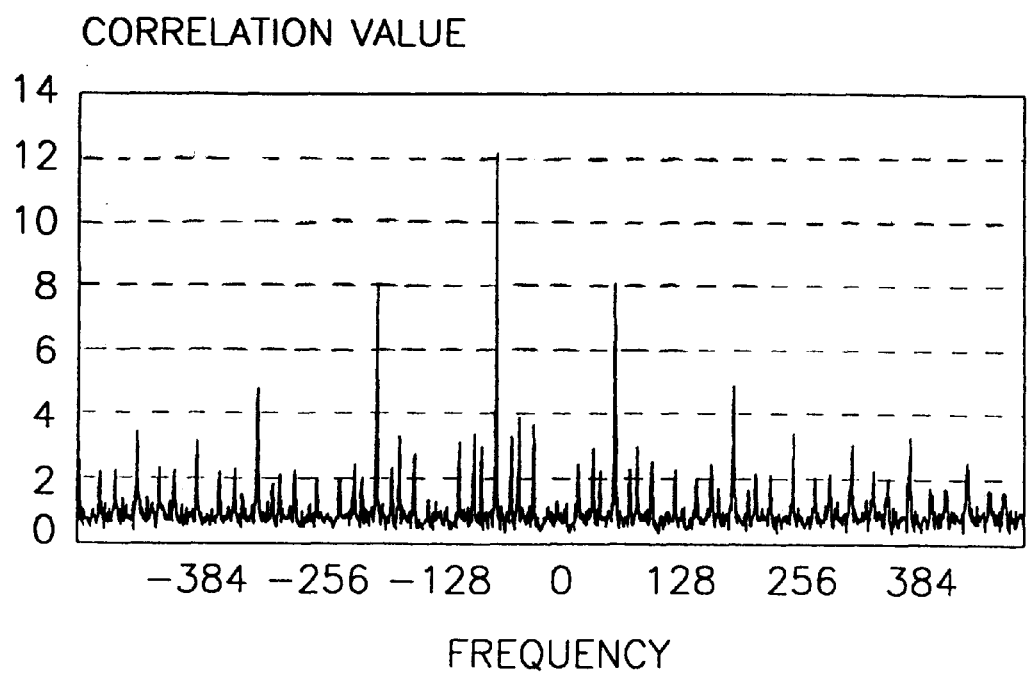
FIGS. 5A and 5B are graphs illustrating the results of simulation according to a method of detecting a coarse frequency offset, according to the present invention.
Figure 5B:
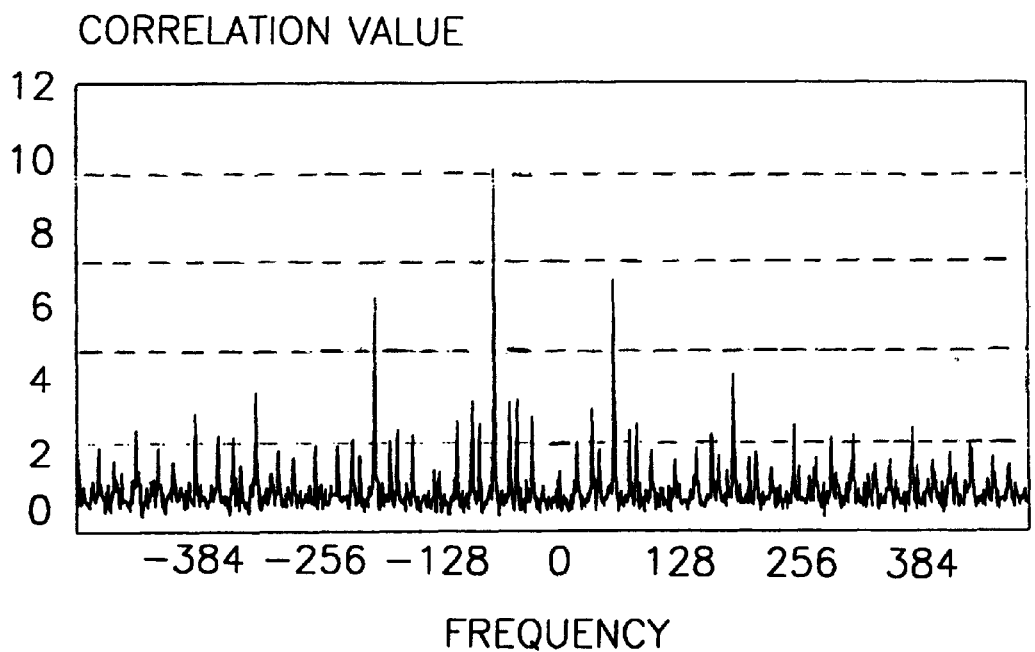
Figure 6A:
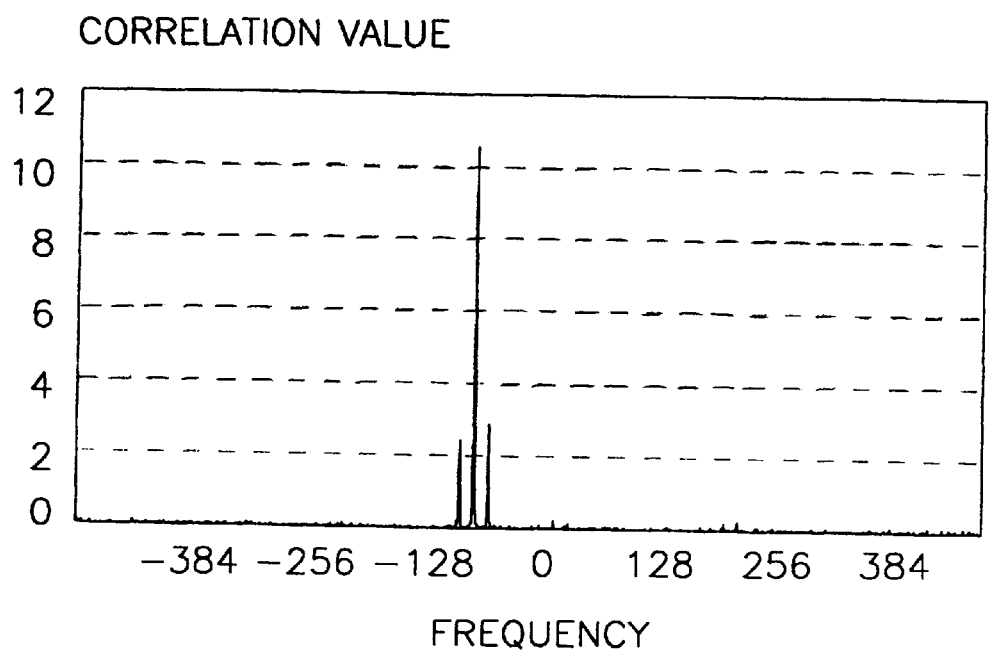
FIGS. 6A and 6B are graphs illustrating the results of simulation according to a conventional method of detecting a coarse frequency synchronization offset.
Figure 6B:
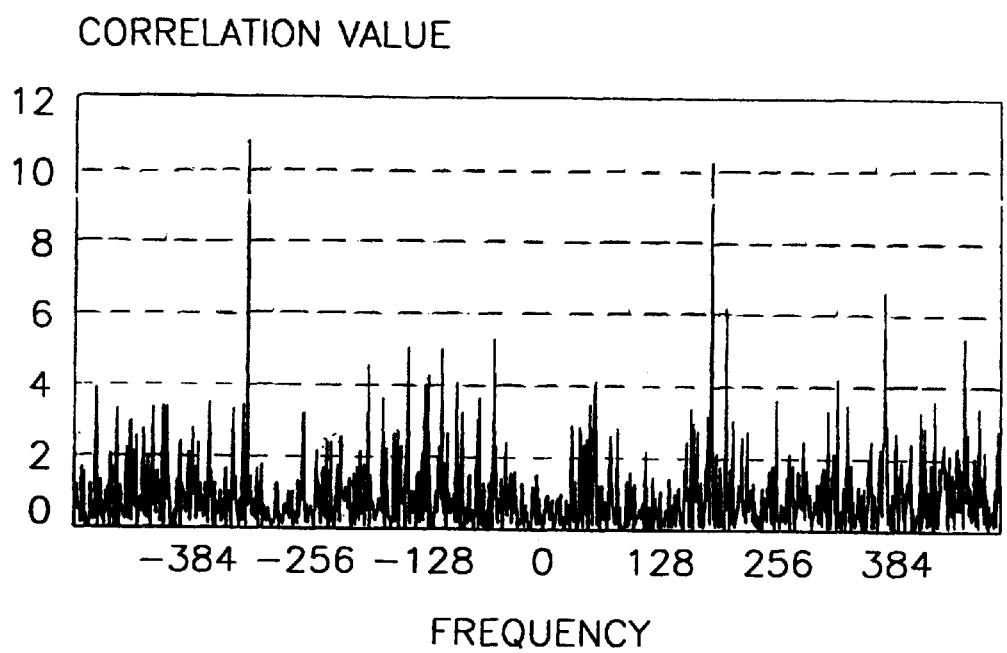

Simulation was performed to verify whether a coarse frequency synchronization offset is properly detected by the method and device according to the present invention. FIGS. 5A and 5B show the results of the above-mentioned simulation as graphs, and FIGS. 6A and 6B show the results of simulation according to a conventional method of detecting a coarse frequency synchronization offset to compare the. conventional simulation to the simulation according to the present invention. In the experimental conditions of simulation, a Gaussian channel having a signal-to-noise ratio (SNR) of 5dB is used, the number of sub-carriers is 1024, and a frequency offset is −62.4 times the number of sub-carriers. FIGS. 5A and 6A show the results of simulation performed when a frame timing offset is 0.0, and FIGS. 5B and 6B show the results of simulation performed when a frame timing offset is 10.0. The simulation of coarse frequency synchronization offset detection according to the conventional coarse frequency offset estimation method applies a correlation function with respect to the overall frequency band of a Gaussian channel. Also, in the coarse frequency timing offset detection simulation with respect to the coarse frequency offset estimation method according to the present invention, the number of divided bands is set to be 32, and the correlation values of the divided bands are summed. In FIGS. 5A and 5B, and 6A and 6B, the horizontal axis indicates frequency, and the vertical axis indicates a correlation value. In this case, a given frequency timing offset is −62.4, so that generation of the maximum peak at −62 on the horizontal axis indicates accurate coarse detection of a frequency offset.

Referring to FIGS. 5A and 5B, the result of simulation with respect to the coarse frequency offset estimation method according to the present invention shows that a maximum peak is generated at a frequency of −62 corresponding to the given frequency timing offset not only when no time offset exists in FIG. 5A, that is, when the time offset is 0.0, but also when a time offset exists in FIG. 5B, that is, when the time offset is 10.0. Thus, it can be verified that coarse frequency timing offset detection is relatively accurately performed. However, in the coarse frequency offset estimation method according to the present invention, it is preferable that a time synchronization offset is less than half the number of divided bands.

On the other hand, referring to FIGS. 6A and 6B showing the results of simulation of the conventional coarse frequency timing error detection method, when no frame timing offset exists, that is, when a frame timing offset is 0.0, accurate detection of a coarse frequency offset is possible as shown in FIG. 6A. However, when a time offset exists, that is, when the time offset is 10.0, no peak is generated at a frequency of −62 corresponding to the given frequency timing offset, as shown in FIG. 6B. This indicates impossibility of coarse frequency offset detection.

FIGS. 7A through 7D are graphs showing the comparison of a theoretical accuracy with a simulation accuracy according to a frame timing offset range, to explain the accuracy of error detection of a coarse frequency offset estimation method according to the present invention. In the conditions of simulation, a Gaussian channel having an SNR of 5db is used, a time synchronization offset sample section between −50 and 50 is applied, and a frequency offset corresponds to an arbitrary value between −510 and 510.

In FIGS. 7A through 7D, a theoretical section which can accurately detect a frequency timing offset according to the coarse frequency offset estimation method of the present invention is compared with a section obtained through simulation. The theoretical section is indicated by a thick solid line, and the section obtained through simulation is indicated by a thin solid line. Also, in the simulation, 1024 sub-carriers and 2048 sub-carriers are applied, a guard interval corresponds to 128 samples, and a probability to accurately acquire a frequency offset is obtained by applying 100 arbitrary frequency offsets to each time synchronization offset.

Figure 7A:
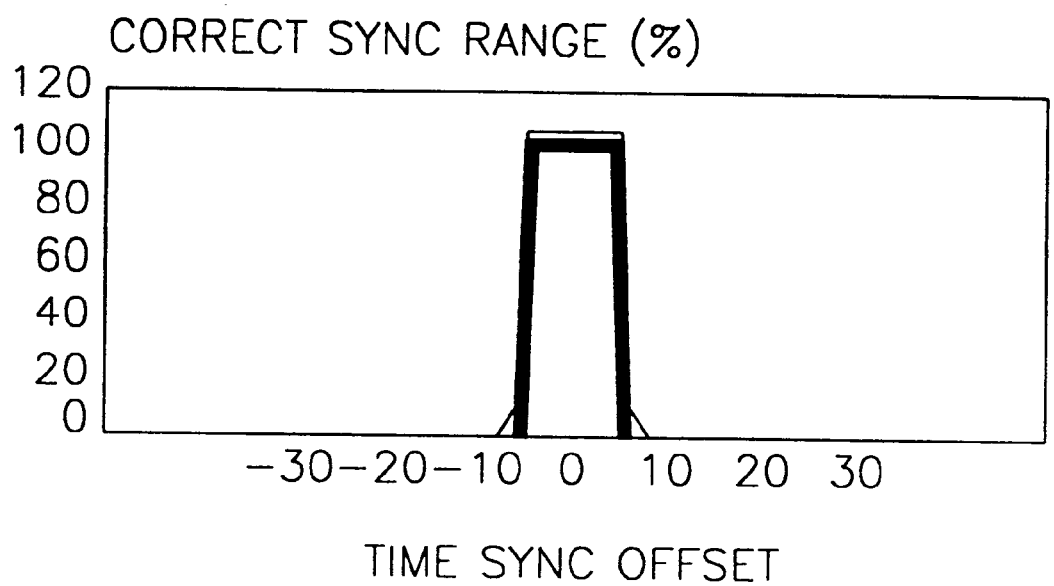
FIGS. 7A through 7D are graphs showing the comparison of a theoretical accuracy with a simulation accuracy according to a frame synchronization offset range, to explain the offset detection accuracy of a coarse frequency offset estimation method according to the present invention.
Figure 7B:
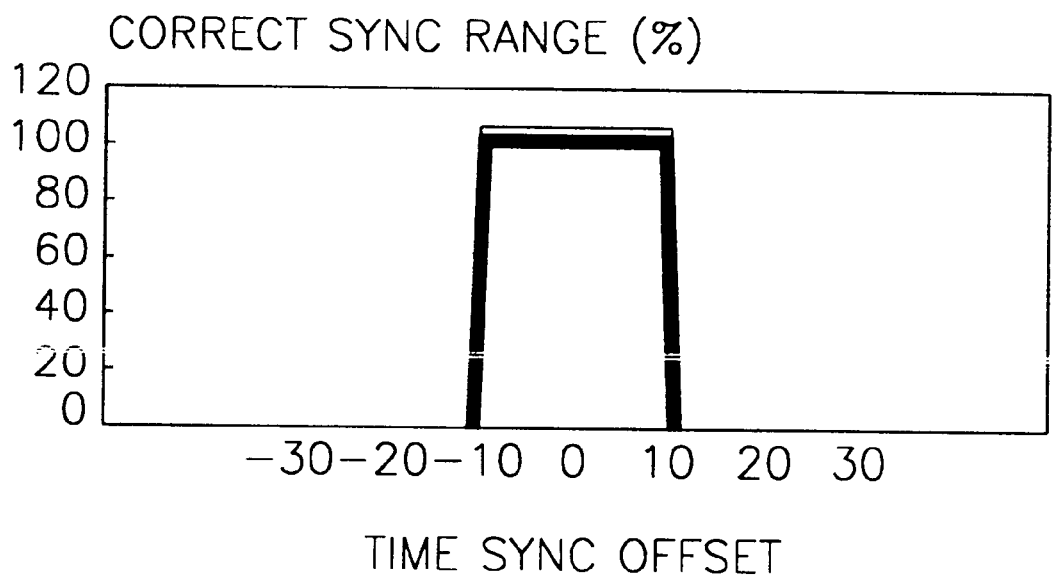
Figure 7C:
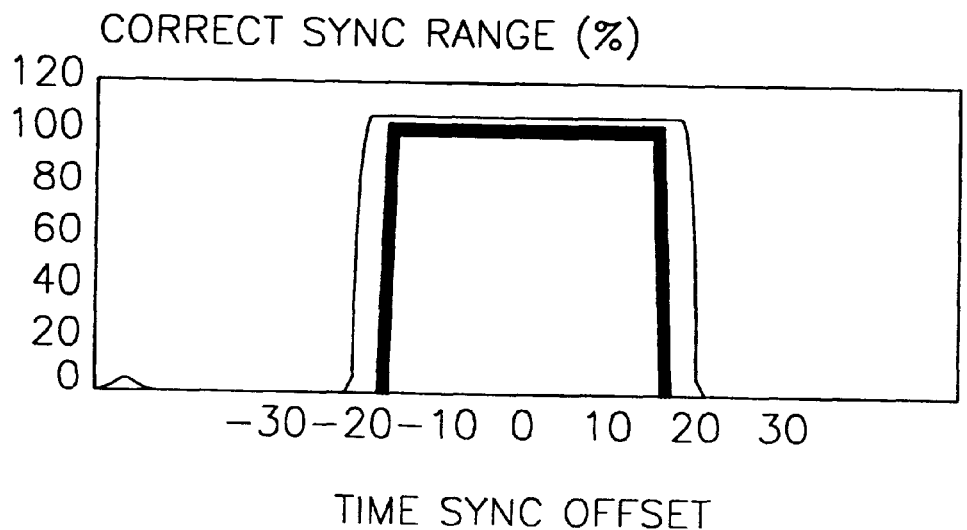
Figure 7D:
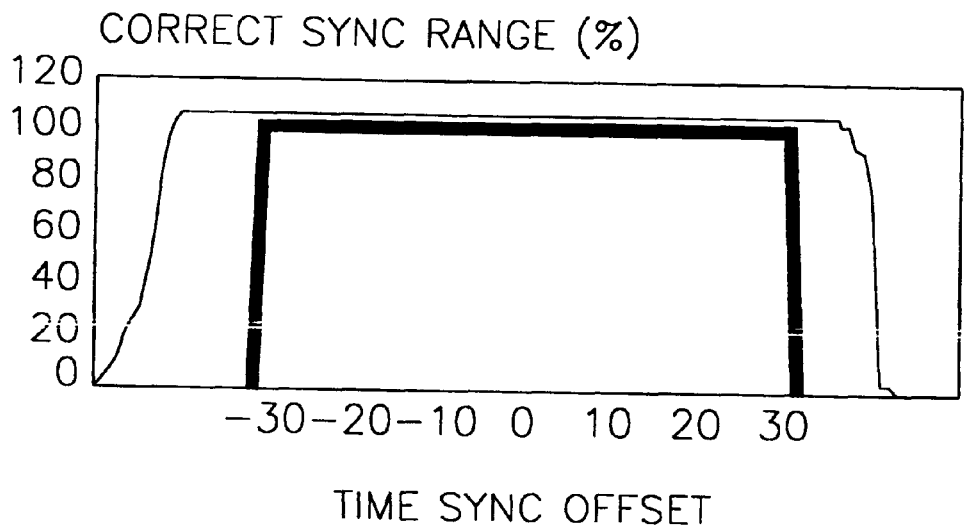

Referring to FIG. 7A through 7D, when a divided band $BW_s$ (=1/K BW) among K divided bands theoretically proposed by the method according to the present invention is used as an integration section of a correlation function, this indicates that coarse frequency offset detection is always possible when a time offset expressed in a multiple of sub-carrier is within K/2. FIG. 7A refers to a case in which a divided band $BW_s$ is 1/8 BW, FIG. 7B refers to a case in which a divided band $BW_s$ is 1/16 BW, FIG. 7C refers to a case in which a divided band Bws is 1/32 BW, FIG. 7D refers to a case in which a divided band $BW_s$ is 1/64 BW. Referring to the results of simulation for estimating the performance of a method according to the present invention, a method of dividing an integration section and obtaining a correlation value according to the present invention can accurately detect a coarse frequency timing offset with respect to a time synchronization offset which can be covered by frame synchronization, as compared to a case in which the integration section is not divided.

According to the method of the present invention as described above, when the calculation quantity of complex multiplication is based in an OFDM system using N sub-carriers, the calculation quantity in the method according to the present invention is proportional to $N^2$. However, a conventional method using the unit response of a channel requires a calculation quantity which is proportional to $$N \times \left[ N + \frac{N}{2} \log_2 N \right].$$

Hence, the method according to the present invention can reduce the calculation quantity by $$\frac{N^2}{2} \log_2$$

while being stably performed likewise the conventional method within an offset range of a coarse frame timing algorithm. When the reduced calculation quantity is compared with the calculation quantity in the conventional method, a case using 1024 sub-carriers requires only a calculation quantity corresponding to 1/6 times the calculation quantity of the conventional method, and a case using 2048 sub-carriers requires only a calculation quantity corresponding to 1/11 times that of the conventional method. Also, the reduced calculation quantity is the same as the calculation quantity obtained by removing N IFFT processes. Here, N is the number of sub-carriers.

As described above, in the method and device for estimating a coarse frequency offset in an OFDM receiver, stable frequency synchronization can be performed by a small quantity of calculation.

What is claimed is:

1. A device for estimating a coarse frequency offset, which is included in a frequency offset estimator of an orthogonal frequency division multiplexing (OFDM) receiver, the device comprising:

a buffer for receiving demodulated symbol X(k) and cyclic shifting the symbol X(k) by a predetermined shift amount d and outputting shifted symbol X(k+d);

a reference symbol generator for generating a reference symbol Z(k);

a counter for counting the shift amount of d;

a partial correlation for receiving the shifted symbol X(k+d) and the phase reference symbol Z(k) and calculating a partial correlation value $$\sum_{m=0}^{K-1} \left| \sum_{k=m(N/K)}^{(m+1)(N/K)-1} X(((k+d)_N) Z^*(k)) \right|$$

with respect to K divided bands, wherein a range of shift amount d is between −N/2 and N/2; and a maximum detector for obtaining a shift amount of d by which the partial correlation value is maximum, and outputting the shift amount of d as an estimated coarse frequency offset value.

2. The device of claim 1, wherein the number of divided bands, K, is set to be within 2 $T_{off}$ when a timing synchronization offset which can be covered by frame synchronization is set to be $T_{off}$.

3. A method of estimating a coarse frequency offset in an orthogonal frequency division multiplexing (OFDM) receiver which performs OFDM demodulation and frequency synchronization, the method comprising the steps of:

(a) generating a reference symbol Z(k);

(b) counting the shift amount of d;

(c) receiving the shifted symbol X(k+d) and the phase reference symbol Z(k);

(d) calculating a partial correlation value $$\sum_{m=0}^{K-1} \left| \sum_{k=m(N/K)}^{(m+1)(N/K)-1} X(((k+d)_N) Z^*(k)) \right|$$

with respect to K divided bands, wherein a range of shift amount d is between −N/2 and N/2; and (e) obtaining a shift amount of d by which the partial correlation value is maximum, and outputting the shift amount of d as an estimated coarse frequency offset value.

4. The device of claim 3, wherein the number of divided bands, K, is set to be within 2 $T_{off}$ when a timing synchronization offset which can be covered by frame synchronization is set to be $T_{off}$.

5. An orthogonal frequency division multiplexing (OFDM) receiver comprising:

a buffer for receiving demodulated symbol X(k) and cyclic shifting the symbol X(k) by a predetermined shift amount d and outputting shifted symbol X(k+d);

a reference symbol generator for generating a reference symbol Z(k);

a counter for counting the shift amount of d;

a partial correlation for receiving the shifted symbol X(k+d) and the phase reference symbol Z(k) and calculating a partial correlation value $$\sum_{m=0}^{K-1} \left| \sum_{k=m(N/K)}^{(m+1)(N/K)-1} X(((k+d)_N) Z^*(k)) \right|$$

with respect to K divided bands, wherein a range of shift amount d is between −N/2 and N/2; and a maximum detector for obtaining a shift amount of d by which the partial correlation value is maximum, and outputting the shift amount of d as an estimated coarse frequency offset value.

6. The device of claim 5, wherein the number of divided bands, K, is set to be within 2 $T_{off}$ when a timing synchronization offset which can be covered by frame synchronization is set to be $T_{off}$.

* * * * *